United States Patent [19]

Broida

[11] Patent Number: 4,552,443
[45] Date of Patent: Nov. 12, 1985

[54] CAMERA SYSTEM

[76] Inventor: Joel G. Broida, 9430 La Jolla Shores Dr., La Jolla, Calif. 92037

[21] Appl. No.: 642,118

[22] Filed: Aug. 20, 1984

Related U.S. Application Data

[63] Continuation-in-part of Ser. No. 172,774, Jul. 28, 1980, Pat. No. 4,468,106.

[51] Int. Cl.⁴ .............................................. G03B 15/03
[52] U.S. Cl. .................................................... 354/132
[58] Field of Search ............ 354/126, 129, 132, 145.1, 354/148; 315/241 P, 323, 360

[56] References Cited

U.S. PATENT DOCUMENTS

| | | | |
|---|---|---|---|
| 3,895,388 | 7/1975 | Townsend | 354/132 |
| 4,329,629 | 5/1982 | Takayama | 315/323 |
| 4,415,247 | 11/1983 | Takematsu | 315/241 P X |
| 4,437,748 | 3/1984 | Kelly | 354/132 |

OTHER PUBLICATIONS

Elektor, "Flash Sequencer", Anon, Nov. 1979, vol. 5, No. 11, pp. 14 and 15.

Primary Examiner—William B. Perkey
Attorney, Agent, or Firm—Polster, Polster and Lucchesi

[57] ABSTRACT

In a camera system in which a shutter is opened and closed, a plurality of light sources are controlled to be energized serially following the opening of the shutter. The number of light sources to be energized is preset by the user, who also predetermines the length of time intervals between successive energizations. The sources can be caused to recycle for a predetermined number of times or to cycle only once. They can be arranged to flash immediately upon opening of the shutter, or to have an initial delay.

4 Claims, 1 Drawing Figure

CAMERA SYSTEM

This is a continuation-in-part of my copending application Ser. No. 172,774, filed July 28, 1980, now U.S. Pat. No. 4,468,106, issued Aug. 28, 1984.

BACKGROUND OF THE INVENTION

In that application, apparatus and method were provided for delaying for a predetermined time the energization of a flash after the shutter of a camera was opened, to produce a blur of motion with a sharp image at the front of the blur. In the course of developing and commercializing the apparatus and method, I have discovered new uses for timing circuits similar to those illustrated in my earlier application, in apparatus to control a plurality of light sources, which has proved to be useful and important in such fields as high fashion photography, among others.

One of the objects of this invention is to provide a camera system employing a plurality of light sources energized sequentially, in a simple and effective way, to permit great versatilty in their use.

Other objects will become apparent to those skilled in the art in light of the following description and accompanying drawing.

SUMMARY OF THE INVENTION

In accordance with this invention, generally stated, in a camera system in which a shutter is opened and closed, when the shutter is open, light sources are energized serially, either starting immediately with a flash or after delay of a predetermined time. The number of light sources to be energized is preset by the user, as is the interval between the energizing of successive light sources. The user also controls whether the light sources are cycled more than once, and if so, how many cycles they are to go through.

DESCRIPTION OF THE PREFERRED EMBODIMENT

Figure 1:
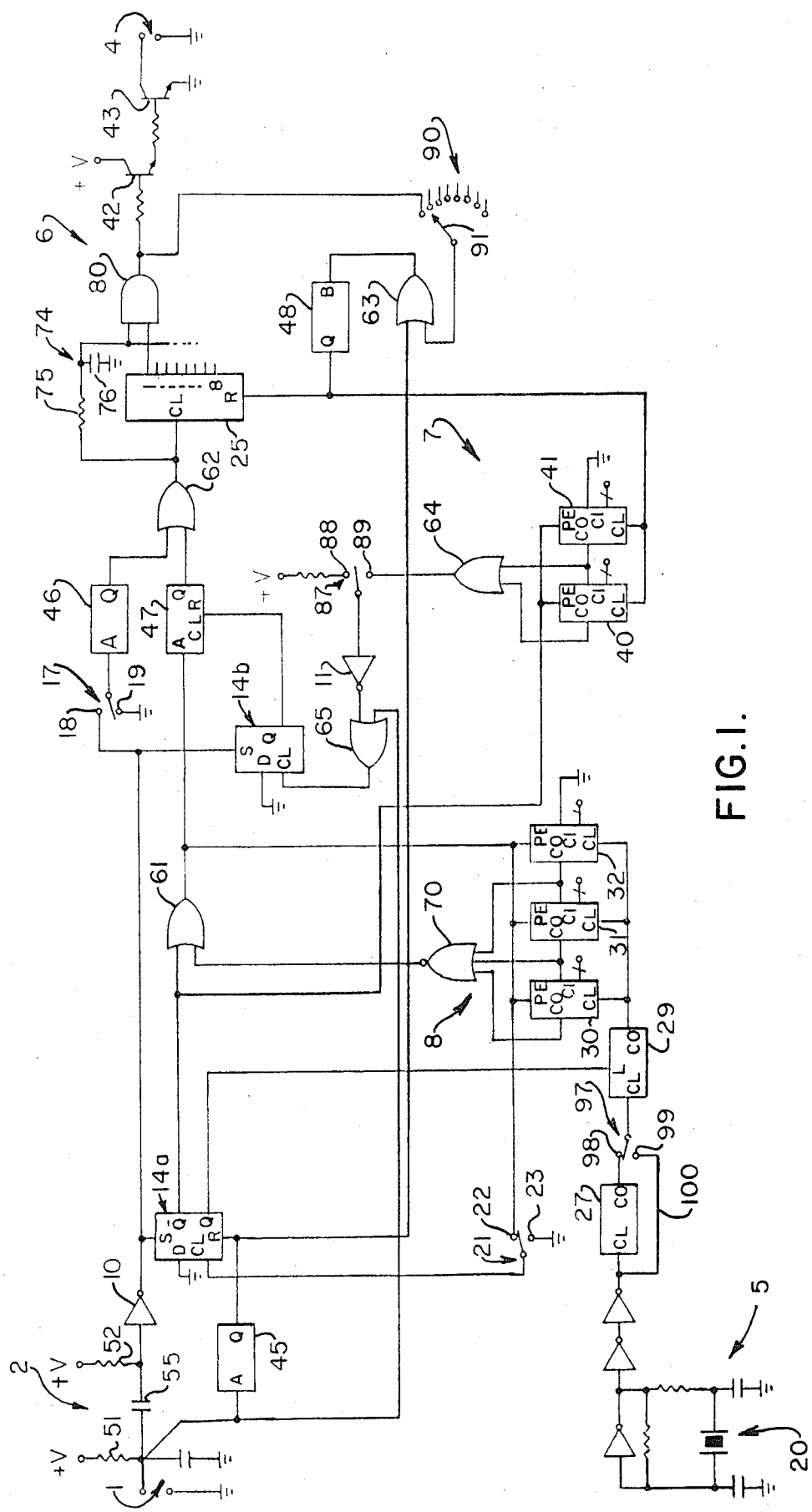
FIG. 1 is a diagrammatic view of one illustrative electrical circuit of this invention.

Referring now to the drawing, reference numeral 1 indicates a camera shutter switch, the closing of which initiates the operation of the circuit. The camera shutter switch is electrically connected to the A terminal of a dual monostable multivibrator (e.g. one half of a CD4528) 45 and an input terminal of an OR gate 65 of a multi-flash unit 6, and to a pulse signal developing circuit 2. The pulse signal developing circuit 2 is made up of a pair of resistors 51 and 52, connected to a battery source not here shown, and a capacitor 55. The pulse signal developing circuit is electrically connected to an inverter 10, which is electrically connected to the "set" terminals of flip-flops 14a and 14b and to a pole 18 of a two-pole initial flash switch 17. The flip-flops 14a and 14b are shown separately for clarity, but will, in practice, generally be a single unit, e.g. a dual type D 4013 with set/reset capability. A pole 19 of the switch 17 is connected to ground. The switch 17 selectively electrically connects poles 18 and 19 to the input terminal A of a dual monostable multivibrator 46.

The flip-flops 14a and 14b have the standard Q, Q-bar, reset, clock and data terminals. The Q-bar terminal of flip-flop 14a is electrically connected to an input terminal of an OR gate 61 and to the Preset Enable terminals of decade counters 40 and 41 of a cycle counter circuit 7. The Q terminal of flip-flop 14a is electrically connected to an enabling terminal of a four-bit counter/divider 29 (e.g. CD 40161), part of a delay time circuit 8. The data terminal is grounded. The clock terminal is electrically connected to a cycle switch 21, by which it can be selectively connected to "single cycle" pole 22 and "repeat cycle" pole 23 of the switch. The reset terminal is electrically connected to the Q terminal of the multivibrator 45 and to an input terminal of an OR gate 63 which is part of a multi-strobe control circuit 6. The pole 23 of the switch 21 is connected to ground. When the switch is connected to pole 23, the system is in a "repeat cycle" mode. The pole 22 is electrically connected to Preset Enable terminals of decade counters 30, 31 and 32 of a delay time circuit 8, thence to a conductor extending between the output terminal of an OR gate 61 and the A terminal of a multivibrator 47. When the switch is connected to pole 22, the system is in a "single cycle" mode.

The data terminal of the flip-flop 14b is grounded, the Q terminal is electrically connected to a Clear terminal of a dual monostable multivibrator 47, e.g. one half of a CD 4528, and the clock terminal, to the output side of the OR gate 65.

The multivibrator 47, like identical multivibrators 45, 46, and 48, has A and B input terminals, and Q and Q-bar output terminals. The A terminal of the multivibrator 47 is electrically connected to the output terminal of the OR gate 61, as are the Preset Enable terminals of the decade counters 30, 31 and 32 of the delay time circuit 8. The other input terminal of the OR gate 61 is electrically connected to the output terminal of a NOR gate 70, part of the delay time circuit 8.

The other input terminal of the OR gate 65 is electrically connected, through an inverter 11, to a cycle count switch 87, which has a "no-count" pole 88 and a "count" pole 89. Pole 88 is connected, through a resistor, to a battery source, not here shown. Pole 89 is electrically connected to the output terminal of an OR gate 64, part of the cycle counter circuit 7.

The Q terminals of the multivibrators 46 and 47 are electrically connected to the two input terminals of an OR gate 62, the output terminal of which is electrically connected to a delay circuit 74, consisting of a resistor 75 and capacitor 76, and to the clock terminal of a decade counter/divider 25, part of the multi-strobe control circuit 6.

The clock terminal of the four-bit binary counter 29 is electrically connected to an oscillator circuit 5, through an oscillator circuit switch 97, one pole 98 of which is connected to a carry out terminal of a decade counter 27 (e.g. CD 4017), and the other pole 99 of which is connected to a by-pass conductor 100 which by-passes the counter 27. Both the by-pass conductor 100 and the clock terminal of the counter 27 are electrically connected to a sixteen kilohertz crystal oscillator 20. A contact movable between poles 98 and 99 is electrically connected to the clock terminal of the decade counter/divider 29. The counter 29 is programed to divide by sixteen. The carry out terminal of the counter 29 is electrically connected to the clock terminals of counters 30, 31 and 32 of the delay time circuit 8.

The counter 25 is shown in this illustrative embodiment as having eight output terminals (e.g. a CD 4017.) Each is electrically connected to a flash circuit, although only one complete flash circuit is shown, connected to the first terminal. Each flash circuit consists of an AND gate 80, one input terminal of which is connected to the delay circuit 74 and the other to an output terminal of the counter 25, and the output terminal of which is connected to one of the terminals of an eight position selector switch 90 and to serially connected transistors 42 and 43, thence to a strobe type light source (flash). A movable contact 91 of the selector switch 90 is electrically connected to the other input terminal of OR gate 63.

The output terminal of OR gate 63 is electrically connected to a B terminal of multivibrator 48, the Q terminal of which is electrically connected to the reset terminal of the counter 25, and to the clock terminals of the counters 40 and 41 of the cycle counting circuit 7.

The Carry In terminal of the counter 41 (which in this embodiment is shown as a CD 4029) is grounded. The Carry Out terminal is electrically connected to one of the input terminals of the OR gate 64 and to the Carry In terminal of the counter 40, the Carry Out terminal of which is connected to the other input terminal of the OR gate 64. Thumbwheel switches set the counting of the cycle counter circuit counters 40 and 41.

The delay time circuit 8 includes similar serially electrically connected CD 4029 counters. The Carry In terminal of the counter 32 is grounded, its Carry Out terminal connected to one of the input terminals of NOR gate 70 and to the Carry In terminal of the counter 31; the Carry Out terminal of the counter 31 is connected to a second input terminal of NOR gate 70 and to the Carry In terminal of the counter 30. The Carry Out terminal of the counter 30 is connected to the third input terminal of the NOR gate 70. Thumbwheel switches set the counting of the counters 30–32.

In operation of the illustrative embodiment shown in FIG. 1, when the shutter of the camera is opened, the switch 1 is closed, causing a signal to the pulse forming circuit 2 to go low, and producing, by virtue of the pulse forming circuit 2 and the inverter 10, a positive pulse that enables the flip-flops 14a and 14b. The terminal Q of the flip-flop 14a goes high, enabling the counter 29. If the terminal 18 of the initial flash switch 17 is electrically connected to the multivibrator 46, a pulse from the multivibrator, through the OR gate 62, triggers an initial flash. The cycle switch 21 is in the "repeat cycle" position.

The enabling of the counter 29 starts the counting of the delay time counters. If the counter/divider 27 is in the circuit, the delay time can be set between 0.01 and 10 seconds, in 0.01 second increments; if it is bypassed, delay time can be set between 1 millisecond and 1 second, in millisecond increments. When all of the carry-out terminals of the counters 30, 31, and 32 have gone low, i.e. when the preset count has been reached, the output terminal of the NOR gate 70 transmits a high signal to the OR gate 61, which transmits a high signal to the multivibrator 47, triggering a flash. The delay time circuit continues to function, resetting after a 10 microsecond delay. If the strobe light that has flashed is not electrically connected to the OR gate 63 through one of the contacts of the selector switch 90, i.e., if the preset number of strobe flashes has not been fired sequentially, the delay time circuit will again trigger the counter 25 to trigger the next counter terminal and strobe, until the strobe is reached which is connected through the selector switch to the OR gate 63. At that time, the output terminal of the OR gate 63 goes high, triggering the cycle counter circuit 7 to cause it to count once, and also to cause the counter 25 to reset, and the cycle to repeat. When the number of cycles that has been set by means of thumbwheel switches controlling the cycle count counters has been reached, the output terminal of the OR gate 64 goes low. Assuming that the cycle count switch 87 is electrically connecting the cycle counter circuit 7 to the inverter 11 and OR gate 65, the clock input of the flip-flop 14b goes high, causing the Clear input of multivibrator 47 to go low and block any input from the OR gate 61 to the clock terminal of the counter 25. This effectively shuts down the strobe flash system.

If the movable contact of the switch 87 is in electrical contact with the pole 88, the cycle counter circuit 7 is in effect removed from the system, and the cycles will continue as long as the shutter is open. If the cycle switch 21 is in the single cycle mode, as shown on the drawing, the high signal resulting from the triggering of the NOR gate 70 when the counters 30, 31 and 32 go low is transmitted to the clock terminal of the flip-flop 14a, causing Q to go low, closing down the circuit at the counter 29.

When the shutter is closed, the switch 1 is opened, the terminal A of the multivibrator 45 goes high, producing a reset pulse for the flip-flop 14a and counters 25, 40, and 41.

While one illustrative embodiment of this invention has been shown and described, it will be apparent to those skilled in the art that other means can be used to accomplish the results. Merely by way of example and not of limitation, the timing circuit 8 can be an analog circuit analagous to the one shown in FIGS. 3 and 4 of my prior application Ser. No. 172,774. The entire circuit, except for power transistors and the like can be put on a custom chip such as a customized Motorola 68705. The thumbwheel switches described as being used to permit selective setting of the counters can be replaced with other forms of BCD control switches, as is well known. More or fewer strobe lights or other light sources can be employed, with appropriate modification of the control circuit, and different ranges of cycles and delay times can easily be provided. Although it poses some problems not met in the parallel arrangement shown and described, the counters 30, 31 and 32 can be arranged serially, as illustrated in my prior application. Various particular values of resistors and capacitors, and varieties of counters, multivibrators, flip-flops and the other elements of the circuit can be used to suit the purpose of the user. Although the switch 1 has been described as a shutter switch, it is not necessary that the switch be actuated by the shutter mechanism or even in response to the opening of the shutter. For example, if it is desired to take a picture, either single exposure or multi-exposure, of a falling object, say for an advertisement, the display can be set up and the camera focused, all the lights turned off, the shutter opened, the object released and then, the shutter switch closed, by some means actuated in response to the release of the object (e.g., an i.r. photocell or a sound trigger). The term shutter switch is therefore used to mean broadly a switch adapted to be closed when a camera shutter is open. Although the circuit shown and described is intended to produce precise, uniform intervals between successive flashes, it will be apparent to those skilled in the art that by modifying the system or using more than one such circuit, precisely preset but different intervals between successive flashes or groups of flashes can be provided. These variations are merely illustrative.

I claim:

1. In a camera system in which a shutter is opened and closed, the improvement comprising a plurality of light sources, means for energizing said light sources serially when said shutter is open, means for selectively setting the numbers of light sources to be energized serially, means for selectively setting the length of the time intervals between energization of consecutive of said light sources, and means for selectively causing and preventing recycling of said light sources.

2. In a camera system in which a shutter is opened and closed, the improvement comprising a plurality of light sources, means for energizing said light sources serially when said shutter is open, means for selectively setting the numbers of light sources to be energized serially, means for selectively setting the length of the time intervals between energization of consecutive of said light sources, means for cycling said light sources, means for counting the numbers of cycles and means for shutting down the system after a predetermined number of cycles.

3. In a camera system in which a shutter is opened and closed, the improvement comprising a plurality of light sources, means for energizing said light sources serially when said shutter is open, means for selectively setting the numbers of light sources to be energized serially, means for selectively setting the length of the time intervals between energization of consecutive of said light sources, means for cycling said light sources, means for counting the numbers of cycles, means for shutting down the system after a predetermined number of cycles, and means for disabling said cycle number counting means.

4. The system of claim 3 including means for selectively causing and preventing continuous recycling of said light sources.

* * * * *